US008843989B2

(12) United States Patent
Manthoulis

(10) Patent No.: US 8,843,989 B2
(45) Date of Patent: Sep. 23, 2014

(54) METHOD AND SYSTEM TO PROVIDE INTERACTIVE TELEVISION CONTENT

(75) Inventor: Orestis Manthoulis, Sausalito, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1292 days.

(21) Appl. No.: 11/704,688

(22) Filed: Feb. 9, 2007

(65) Prior Publication Data
US 2008/0196071 A1    Aug. 14, 2008

(51) Int. Cl.
H04N 7/16 (2011.01)
H04N 21/858 (2011.01)
H04N 21/235 (2011.01)
H04N 21/462 (2011.01)
H04N 21/4722 (2011.01)
H04N 21/81 (2011.01)
H04N 21/258 (2011.01)
H04N 7/173 (2011.01)

(52) U.S. Cl.
CPC ......... H04N 7/17318 (2013.01); H04N 21/858 (2013.01); H04N 21/235 (2013.01); H04N 21/4622 (2013.01); H04N 21/4722 (2013.01); H04N 21/812 (2013.01); H04N 21/25866 (2013.01)
USPC ........................................................ 725/135

(58) Field of Classification Search
CPC  H04N 5/4401; H04N 7/17318; H04N 21/235
USPC ............................................. 725/59–61, 135
See application file for complete search history.

(56) References Cited

U.S. PATENT DOCUMENTS 4,750,036 A    6/1988  Martinez
5,589,872 A    12/1996 Martinez
6,314,565 B1 * 11/2001 Kenner et al. ................. 717/171
7,103,904 B1 *  9/2006 Blackketter et al. ............ 725/32
2002/0129364 A1 *  9/2002 Smith et al. ..................... 725/37
2005/0081237 A1 *  4/2005 Chen et al. ...................... 725/35
2005/0137958 A1 *  6/2005 Huber et al. .................... 705/37
2005/0166257 A1 *  7/2005 Feinleib et al. ............... 725/136
2007/0022438 A1 *  1/2007 Arseneau et al. ............... 725/45
2009/0094632 A1 *  4/2009 Newnam et al. ................ 725/24

FOREIGN PATENT DOCUMENTS

WO    02/43392 A1    5/2002
WO    03/085982 A2   10/2003

OTHER PUBLICATIONS

International Search Report and Written Opinion of the International Searching Authority for International Application No. PCT/US2008/000488, mailed Jun. 12, 2008.
"Interactive TV Explained," Retreived from <<http://www.lordpercy.com/interactive_tv_explained.htm>>, Jan. 10, 2007, pp. 1-4.
"Enhanced TV," Wiklpedia, the free encyclopedia, Retrieved Jan. 10, 2010, Wkipedia, Wikimedia Foundation, San Francisco, California, 1 page.

* cited by examiner

Primary Examiner — Benjamin R Bruckart
Assistant Examiner — Anthony Bantamoi
(74) Attorney, Agent, or Firm — Toler Law Group, PC

(57) ABSTRACT

Methods and systems for providing interactive television are provided. A method may include sending television content received from a content source to a user device. The method may also include sending at least one interactive program trigger. The interactive program trigger may be adapted to cause the user device to initiate execution of processor executable instructions stored at the user device to provide at least one interactive display related to the television content at a display device.

29 Claims, 6 Drawing Sheets

METHOD AND SYSTEM TO PROVIDE INTERACTIVE TELEVISION CONTENT

FIELD OF THE DISCLOSURE

The present disclosure is generally related to providing interactive television content.

BACKGROUND

Television is a popular form of entertainment. Additionally, television can be a useful medium for presenting information or advertising. There have been attempts to make television interactive. However, certain limitations may make such interactive television methods undesirable. For example, bandwidth limitations may cause interactive content to be delayed. Hence, there is a need for an improved method and system to provide interactive television.

DETAILED DESCRIPTION OF THE DRAWINGS

In a particular embodiment, an interactive television system may include at least one output. The at least one output may send television content received from a content source to a remote user device. The at least one output may also send a trigger signal to the remote user device. The remote user device may execute pre-loaded instructions based on the trigger signal to provide at least one interactive feature associated with the television content.

In a particular embodiment, a set-top box device for providing interactive television content may include a memory. The memory may include instructions executable based on at least one trigger signal to provide at least one interactive display at a display device in communication with the set-top box device. The set-top box device may also include an input to receive a data stream from a remote network device. The data stream may include television content and the at least one trigger signal. The set-top box device may also include logic to execute the instructions in response to the at least one trigger signal.

In a particular embodiment, a method of providing interactive television content may include sending television content received from a content source to a user device. The method may also include sending at least one interactive program trigger. The at least one interactive program trigger may be adapted to cause the user device to initiate execution of processor executable instructions stored at the user device to provide at least one interactive display related to the television content at a display device.

In a particular embodiment, a method of providing interactive television may include receiving, at a user device, a data stream from a remote network device. The data stream may include television content and at least one trigger signal. The method may also include executing processor executable instructions stored at the user device based the at least one trigger signal to generate at least one interactive display at a display device.

In a particular embodiment, a computer readable medium may include computer readable instructions executable by a processor to receive an input data stream. The data stream may include television content and at least one trigger signal associated with specific television content. The instructions may also be executable to generate an interactive display including an interactive feature related to the specific television content based on the at least one trigger signal.

Figure 1:
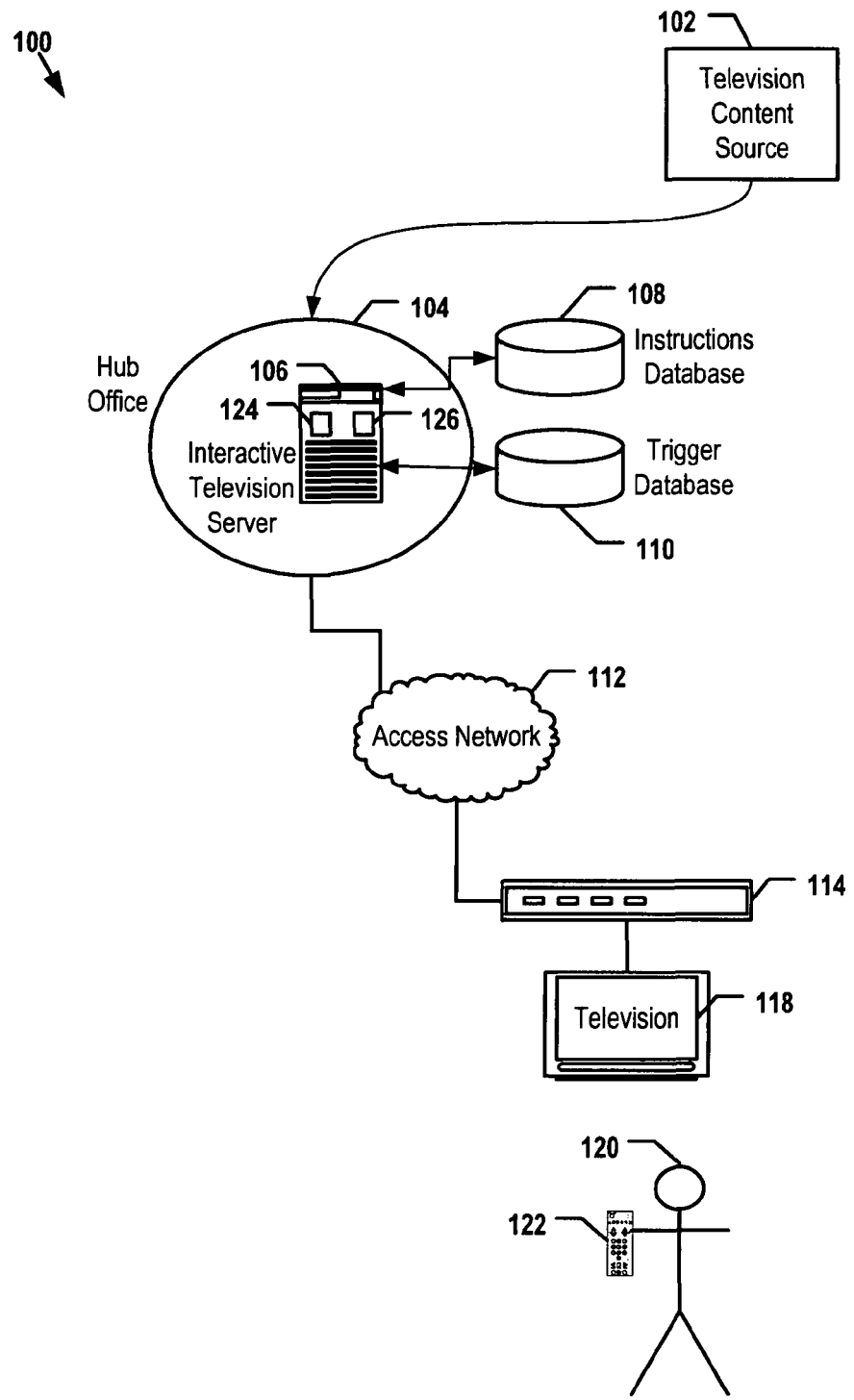
FIG. 1 is a block diagram of a first illustrative embodiment of a system to provide interactive television content.

FIG. 1 depicts a block diagram of a first illustrative embodiment of a system to provide interactive television content, designated 100. The system 100 includes a television content source 102 providing television content to a user device 114 via a hub office 104 and an access network 112. The television content source 102 may include any television content provider. The television content may include television programs, television advertisements, or any combination thereof. In a particular embodiment, the hub office 104 may include the television content source 102. In an illustrative embodiment, the hub office 104 may be a national hub office, a regional hub office, or a local hub office.

The user device 114 may be coupled to or integrated with a display device 118, such as a television monitor. Moreover, the user device 114 may communicate with a remote control device 122. The user devices 114 may include an Internet Protocol Television (IPTV) set-top box device; a video gaming device or a console that is adapted to receive IPTV content; an interface device within the display device 118, such as a cable card; a personal computer or other computing device that is adapted to emulate set-top box device functionalities; any other device adapted to receive IPTV content and transmit data to an IPTV system via an access network 112; or any combination thereof.

The hub office 104 may include, or may be in communication with, an interactive television server 106. For purposes of description, the interactive television server 106 is described as one server; however, in certain embodiments, the interactive television server 106 may include a plurality of servers providing interactive television services. The interactive television server 106 may include, or may be in communication with, an instruction database 108 and a trigger database 110.

In a particular illustrative embodiment, the interactive television server 106 may send processor readable instructions from the instruction database 108 to a user device 114. The processor readable instructions may be executable to provide at least one interactive feature associated with specific television content. The interactive television server 106 may select instructions to send to the user device 114 based on programming requests received from a user 120. In an illustrative embodiment, the interactive television server 106 may select instructions to send to the user device 114 based on historical user information, such as programs previously watched by the user 120. In another illustrative embodiment, the interactive television server 106 may select instructions to send to the user device 114 based on sponsorship settings. For example, the sponsorship settings may include information about television advertisers that have paid to have certain interactive features associated with their advertising content or with other television content. For example, advertisers may associate interactive features such as: information gathering interactive features (e.g., polls); entertainment interactive features (e.g., games); informative interactive features (e.g., product information queries); product request interactive features (e.g., order forms); or any combination thereof. The sponsorship settings may specify the particular instructions associated with the advertising content or other television content. In another illustrative embodiment, the interactive television server 106 may select instructions to send to the user device 114 based on user adjustable settings.

In a particular embodiment, the trigger database 110 may include a plurality of interactive program triggers associated with specific television content. In an illustrative embodiment, the interactive television server 106 may send the specific television content from the television content source 102 to the user device 114. The interactive television server 106 may also send an interactive program trigger associated with the specific television content to initiate an interactive feature of the instructions sent to the user device 114. The interactive program trigger may cause the user device 114 to execute the instructions to provide an interactive display at the display device 118, such as an information gathering interactive feature, an entertainment interactive feature, an informative interactive feature, a product request interactive feature, or any combination thereof.

The user 120 may select a selectable element from the interactive display, for example, by using the remote control device 122. In an illustrative embodiment, the user device 114 may receive the user selection and execute instructions to provide a second interactive display. In another illustrative embodiment, the user device 114 may send data indicating the user selection to the interactive television server 106. The interactive television server 106 may include a user interface module 124 to process the user selection and send additional information to the user device 114. For example, the user interface module 124 may send additional instructions from the instruction database 108 in response to the user selection. In another example, the user interface module 124 may send at least one additional trigger from the trigger data base 110 to the user device 114 in response to the user selection. In still another illustrative embodiment, the user device 114 may receive the user selection, execute additional instructions, and send data related to the user selection to the interactive television server 106.

In a particular embodiment, the interactive television server 106 may send the specific television content associated with an interactive feature substantially simultaneously with the interactive program trigger that initiates the interactive feature. In an illustrative embodiment, the interactive program trigger may be sent via a vertical blanking interval of the television signal.

As an illustrative example, an advertiser may want to give television viewers the ability to order an advertised product during or shortly after a television advertisement for the product is presented to the viewers. The advertiser may provide the television content of the advertisement to the television content source 102. The advertiser or an interactive television service provider may provide instructions that are executable by a processor at one or more remote user devices 114. The instructions may be stored in the instruction database 108. Additionally, an interactive program trigger that initiates the instructions may be stored in the trigger database 110. At a scheduled time, or in response to a received request, the instructions may be sent to the remote user device(s) 114. The advertisement may be sent from the television content source 102 to the remote user device(s) 114 after the instructions are sent. The interactive television service provider or the television content source 102 may include the interactive program trigger with the advertisement. The interactive program trigger may cause the instructions sent to the remote user device(s) 114 to be executed during the advertisement, or shortly after the advertisement, to provide an interactive display allowing the user 120 to order the advertised product.

Figure 2:
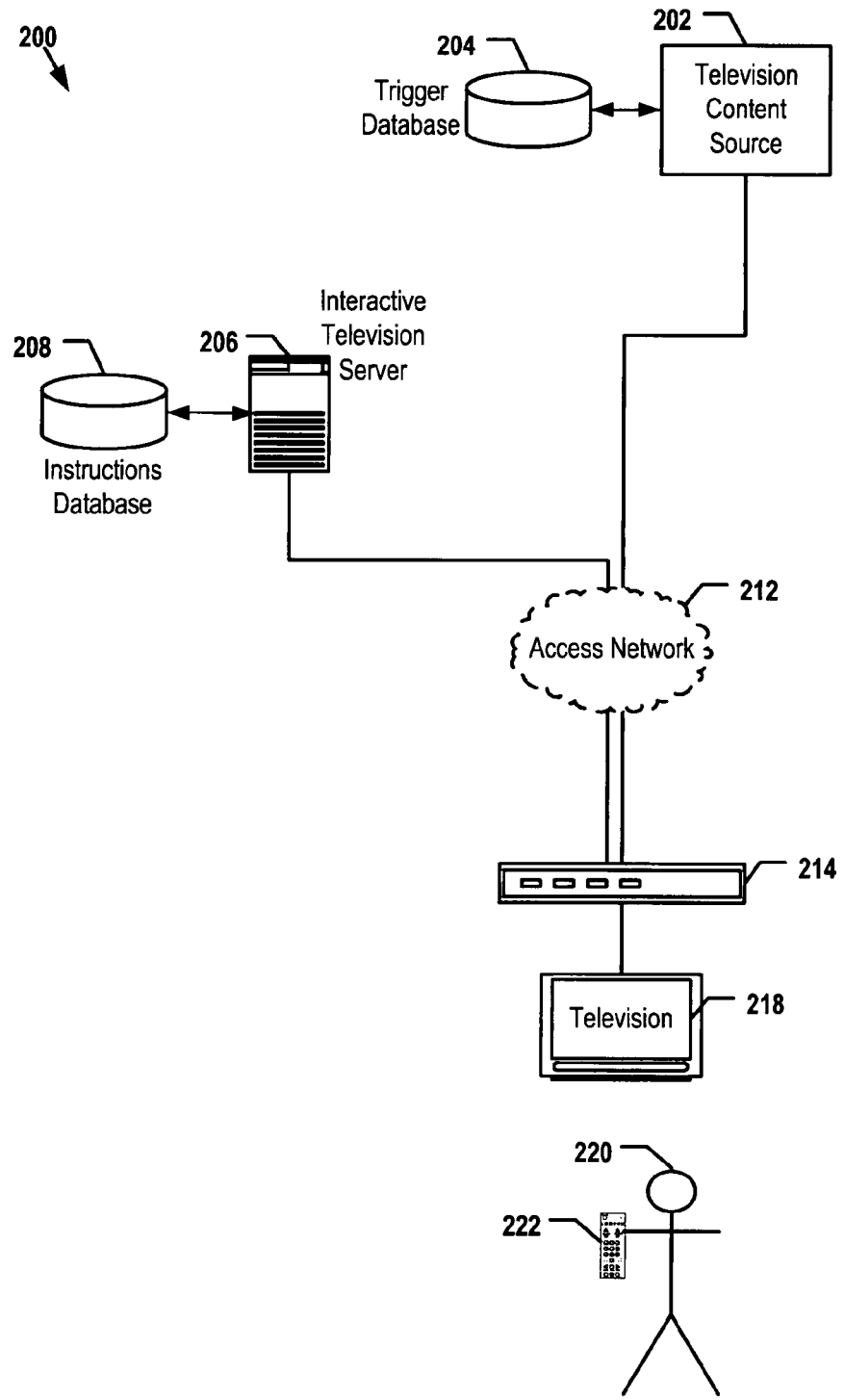
FIG. 2 is a block diagram of a second illustrative embodiment of a system to provide interactive television content.

FIG. 2 depicts a block diagram of a second illustrative embodiment of a system to provide interactive television content, designated 200. The system 200 includes a television content source 202 and an interactive television server 206 communicating with a remote user device 214 via separate communication paths. In a particular embodiment, the television content source 202 and the interactive television server 206 may communicate with the remote user device 214 via an access network 212, such as an access network of an Internet Protocol Television (IPTV) system or other video distribution system. In such an embodiment, the communication paths from the television content source 202 and the interactive television server 206 to the remote user device 214 may intersect via the access network 212.

In a particular embodiment, the interactive television server 206 may select instructions from the instruction database 208 to pre-load to the remote user device 214. The pre-loaded instructions may be executable by a processor at the remote user device 214 to provide at least one interactive feature associated with specific television content.

In a particular embodiment, the television content source 202 may select interactive program triggers from the trigger database 204 that are associated with specific television content, with all television content of a television channel, or any combination thereof. The interactive program triggers may be selected to cause the remote user device 214 to initiate an interactive feature associated with the specific television content via the pre-loaded instructions. In an illustrative embodiment, the interactive program trigger may be sent substantially simultaneously with the specific television program content to the remote user device 214 to provide an interactive display at a remote display device 218.

In a particular embodiment, the remote user device 214 may receive user input via a remote control device 222. In an illustrative embodiment, the remote user device 214 may process the user input to provide a second interactive display at the remote display device 218. For example, the user 220 may provide input requesting product information regarding an advertised product via the first interactive display. In response to the user input, the remote user device 214 may display the requested product information based on information provided via the interactive program trigger or based on the pre-loaded instructions. The remote user device 214 may also provide a second interactive display allowing the user to request more detailed product information or to order the product based on information provided via the interactive program trigger or based on the pre-loaded instructions.

In another particular embodiment, the remote user device 214 may provide a second interactive display at the remote display device 218 in response to additional data provided by the television content source 202 or the interactive television server 206. For example, the remote user device 214 may send data indicating the user input to the interactive television server 206, the television content source 202, or both. In response to the data, the interactive television server 206, or the television content source 202, may send additional data, such as, additional interactive program triggers, additional product data or any combination thereof, to the remote user device 214. The remote user device 214 may display the additional data received from the interactive television server 206 or the television content source 202 at the display device 218 via the second interactive display.

Figure 3:
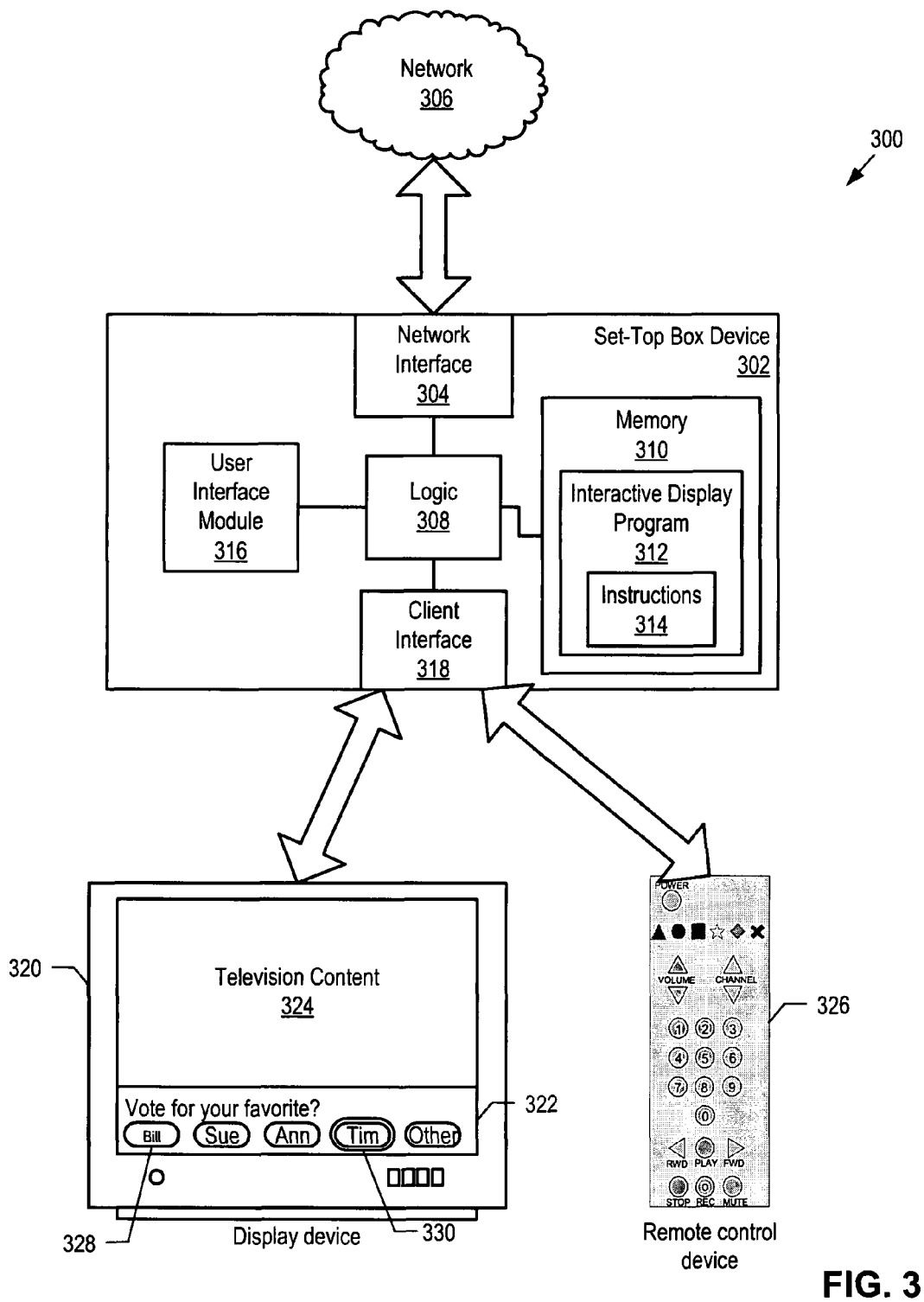
FIG. 3 is a block diagram of a third illustrative embodiment of a system to provide interactive television content.

FIG. 3 depicts a block diagram of a third illustrative embodiment of a system to provide interactive television content, designated 300. The system 300 includes a remote user device, such as the set-top box device 302, communicating with a communication network 306. The set-top box device 302 is also in communication with a display device 320. The set-top box device 302 includes a network interface 304, logic 308, a client interface 318, a memory 310, and a user interface module 316.

In a particular embodiment, the memory 310 may include instructions 314, executable by the logic 308 based on a trigger signal, to provide an interactive display 322 at display device 320. The trigger signal may be received by the network interface 304 from the communication network 306 via a data stream. The data stream received from the communication network 306 may also include television content.

In a particular embodiment, a remote server may send the instructions 314 to the set-top box device 302 via the communication network 306. The instructions 314 may be pre-loaded into the memory 310 of the set-top box device 302 in anticipation of television content. That is, the instructions 314 may be stored in the memory 310 before television content associated with the instructions 314 is received at the set-top box device 302 via the communication network 306. In a particular embodiment, the instructions 314 may be plug-in modules associated with an interactive display program 312 at the set-top box device 302. In such an embodiment, features of the interactive display program 312 may be stored at the set-top box device 302, such that bandwidth required to transmit the instructions 314 to the set-top box device 302 is decreased.

In a particular embodiment, the instructions 314 may be executable by the logic 308 to provide the interactive display 322 at display device 320. The interactive display 322 may include television content 324 and one or more user selectable elements 328 associated with the television content 324. In an illustrative example, the one or more selectable elements 328 may include one or more voting elements. The voting elements may allow a user to express an opinion related to the television content 324. For example, the voting elements may allow the user to select a favorite character in a program, a preferred outcome to a program, a preferred episode of a program, and so forth. In another illustrative example, the user selectable elements 328 may include a participation element. The participation element may allow a user to participate with the television content. For example, the television content 324 may include a game show. The participation element may allow the user to provide an answer associated with a question from the game show.

In a particular embodiment, the user may select at least one selectable element 328 using a remote control device 326. In an illustrative embodiment, the user may select a user selectable element by navigating a selection mechanism 330, such as a highlight mechanism, on the screen until the desired selectable element is selected, and confirming the selection. In another illustrative embodiment, the user may select the user selectable element 328 by entering a value on a keypad of the remote control device 326. In still another illustrative embodiment, the user may select the user selectable element by using a hot key on the remote control device 326 that is associated with the selected element.

The set-top box device 302 may receive user input from the remote control device 326 and process the user input via the user interface module 316. In response to the user input, the logic 308 may modify the interactive display 322. For example, the logic 308 may modify the interactive display 322 to provide additional selectable elements 328. In another example, the logic 308 may modify the interactive display 322 to provide feedback to the user regarding a selected element. For example, the logic 308 may indicate whether a selected answer was correct. The set-top box device 302 may also provide data related to the user selection to a remote device via the communication network 306. In an illustrative embodiment, data indicating the user selection may be provided to an interactive television server via the communication network 306. In response to the user selection, the interactive television server may provide data to the set-top box device 302 related to the user selection. In an illustrative embodiment, the interactive television server may provide data indicating whether a selected answer was correct. In another illustrative embodiment, the interactive television server may provide data to the set-top box device 302 indicating selections made by other users. For example, the interactive television server may tabulate how a number of users voted via an interactive display, and send the voting results to the set-top box device 302. In another example, users may compete in a game via the interactive display. The set-top box device may keep track of a first user's score and send the score to the interactive television server. The interactive television server may compare the first user's score to the scores of other users playing the game to rank the first user game play against the other users. In another illustrative embodiment, interactive television server may send an additional trigger signal to the set-top box device 302. The additional trigger signal may initiate execution of additional instructions from the instructions 314 in the memory 310. Execution of the additional instructions by the logic 308 may cause the interactive display 322 to be changed, or an additional interactive display to be presented.

Data regarding user selections may also be stored at the set-top box device, or at a remote network device to allow historical data to be gathered. Historical data regarding individual users, or an aggregation of historical data regarding a plurality of users may be useful to understand the user participation levels, to establish user participating ratings, or for marketing purposes, such as targeted marketing, other data analyses, or any combination thereof.

Figure 4:
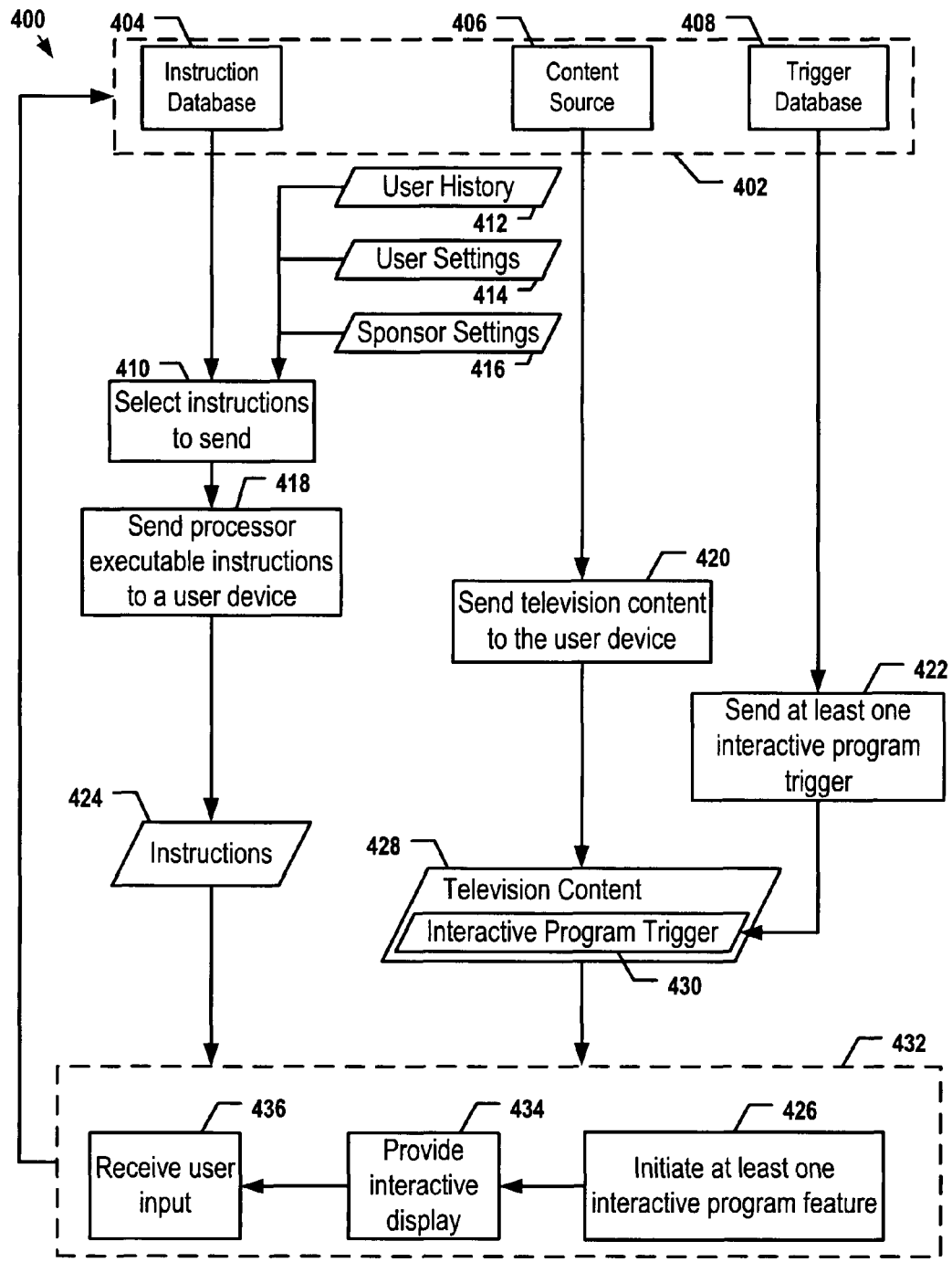
FIG. 4 is a flow chart of a first illustrative embodiment of a method of providing interactive television content.

FIG. 4 depicts a flow chart of a first illustrative embodiment of a method of providing interactive television content, designated 400. The method 400 includes, at 410, selecting processor executable instructions 424 to send to a remote user device 432. In an illustrative embodiment, the instructions 424 may be selected based on user history information 412, adjustable user settings 414, sponsor settings 416, or other criteria. The selected processor executable instructions 424 may be executable to provide at least one interactive feature associated with specific television content 428. The method 400 also includes, at 418, sending the processor executable instructions 424 to the user device 432.

In a particular embodiment, the method 400 also includes sending television content, including the specific television content 428, to the user device 432. In an illustrative embodiment, the specific television content 428 may be sent after at least a portion of the processor executable instructions 424 have been sent. In a particular illustrative embodiment, the processor executable instructions 424 may be sent from an instructions database 404, and the television content may be sent from a television source 406. In particular embodiments, the instruction database 404 and the television source 406 may be remote from one another or may be co-located at a video head-end or central office of an interactive television system 402.

In a particular embodiment, the method 400 also includes sending an interactive program trigger 430 to the remote user device 432. The interactive program trigger 432 may cause the interactive program feature to be initiated, at 426. In a particular illustrative embodiment, the method 400 may include sending the interactive program trigger 430 substantially simultaneously with the specific television content 428. For example, the television source 406 and the trigger database 408 may be in communication. The interactive program trigger 430 may be embedded within a television signal including the television content 428. For example, the interactive program trigger 430 may be included in a vertical blanking interval of the specific television content 428. In particular embodiments, the trigger database 408 and the television source 406 may be remote from each other or may be co-located.

The specific television content 428 may include any television programming. For example, the specific television content 428 may include an advertisement, a television program, other television content, all television content of a channel, or any combination thereof. The user device 432 may provide a display including the television content 428 and the at least one interactive feature associated with the interactive program trigger 430, at 434. The method 400 may also include, at 436, receiving user input related to the at least one interactive feature. In a particular illustrative embodiment, the user device 432 may process the user input to provide an additional interactive feature. In another particular illustrative embodiment, the user device 432 may send data related to the user input to the interactive television system 402.

Figure 5:
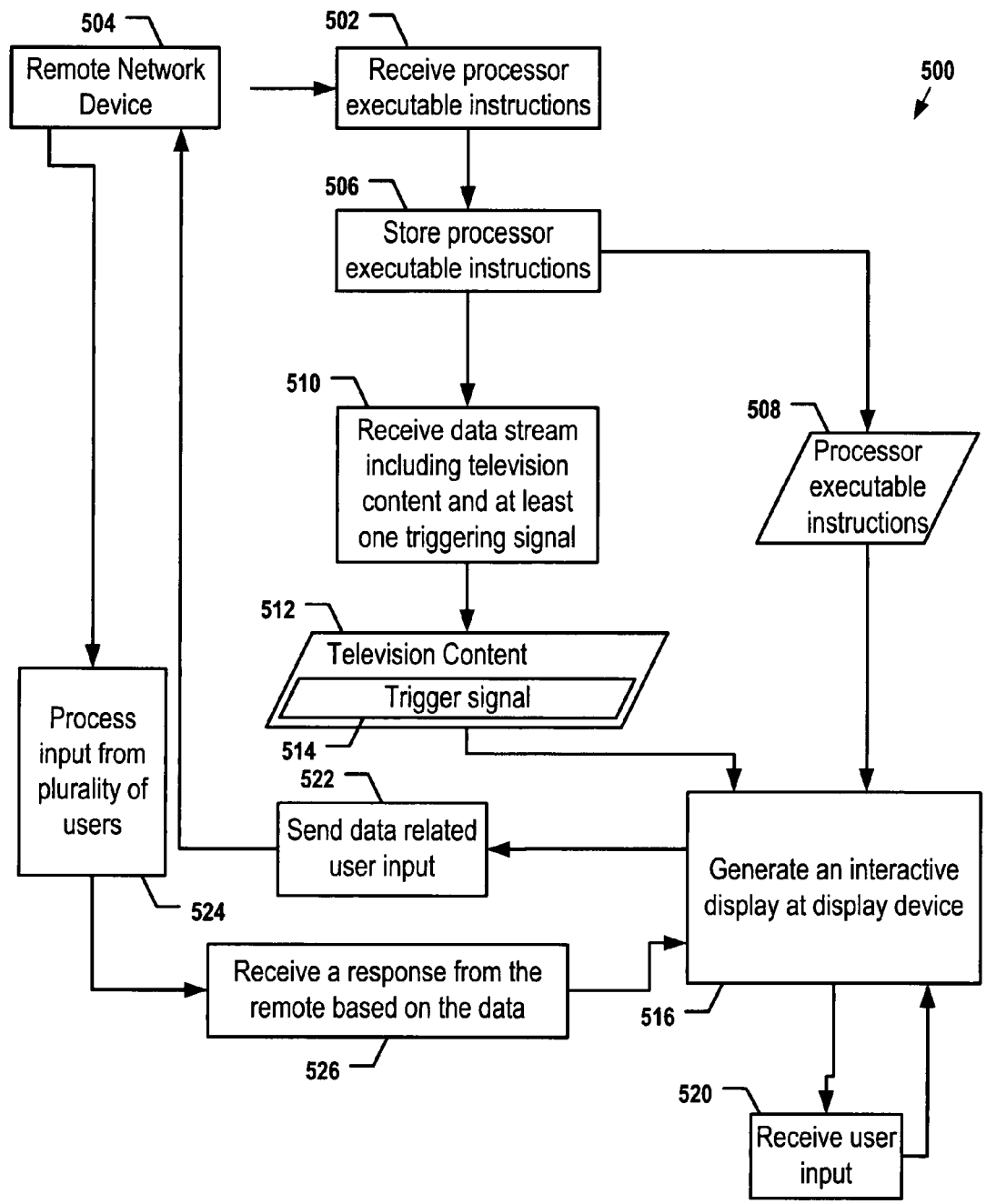
FIG. 5 is a flow chart of a second illustrative embodiment of a method of providing interactive television content.

FIG. 5 depicts a flow chart of a second illustrative embodiment of a method of providing interactive television content, designated 500. The method 500 includes, at 502, receiving processor executable instructions 508 from a remote network device 504. The method 500 also includes, at 506, storing the processor executable instructions 508. In a particular illustrative embodiment, the processor executable instructions may be associated with specific television content 512. In a particular embodiment, the processor executable instructions may be received at a user device, such as a set-top box device, television display device, other user device, or any combination thereof.

The method 500 also includes, at 510, receiving a data stream including television content and at least one trigger signal. The television content may include the specific television content 512 associated with the processor executable instructions 508. In a particular embodiment, the processor executable instructions 508 may be generic, that is, not associated with the specific television content 512. For example, the processor executable instructions 508 may include instructions executable to display generic selectable elements that are not associated with specific television content. In this example, the trigger signal 514 may include data to relate the generic selectable elements to the specific television content 512. For example, the processor executable instructions 508 may include instructions executable to generate an interactive display associated with a quiz game show. In this example, the questions asked on the quiz game show may not be included in the processor executable instructions. Rather, the questions and user selectable answers may be provided via the at least one trigger signal. In a particular embodiment, the specific television content 512 and the trigger signal 514 may be received after the processor executable instructions 508 have been received.

In a particular embodiment, the method 500 may also include, at 516, executing the processor executable instructions 508 in response to the at least one trigger signal 514 to generate at least one interactive display at a display device. In a particular embodiment, the method 500 may include synchronizing the interactive display with the specific television content 512 based on the trigger signal 514.

In a particular embodiment, the method 500 may also include, at 520, receiving user input associated with the interactive display. In response to the received user input, the method 500 may include generating a second interactive display associated with the specific television content.

In a particular embodiment, the method 500 may include, at 522, sending data related to the user input to the remote network device 504. In response to the data related to the user input, the remote network device 504 may send a response. The response may include one or more additional trigger signals, additional television content, or other data associated with the processor executable instructions or the interactive display, or any combination thereof. In a particular embodiment, the method 500 may include, at 524, processing input received from a plurality of users. For example, the input may include interaction with a game. The scores of a plurality of users may be compared to rank the game play of the users. In a particular embodiment, the method 500 may include, at 526, receiving the response from the remote network device 504. The method 500 may also include modifying the interactive television display based on the received response.

Figure 6:
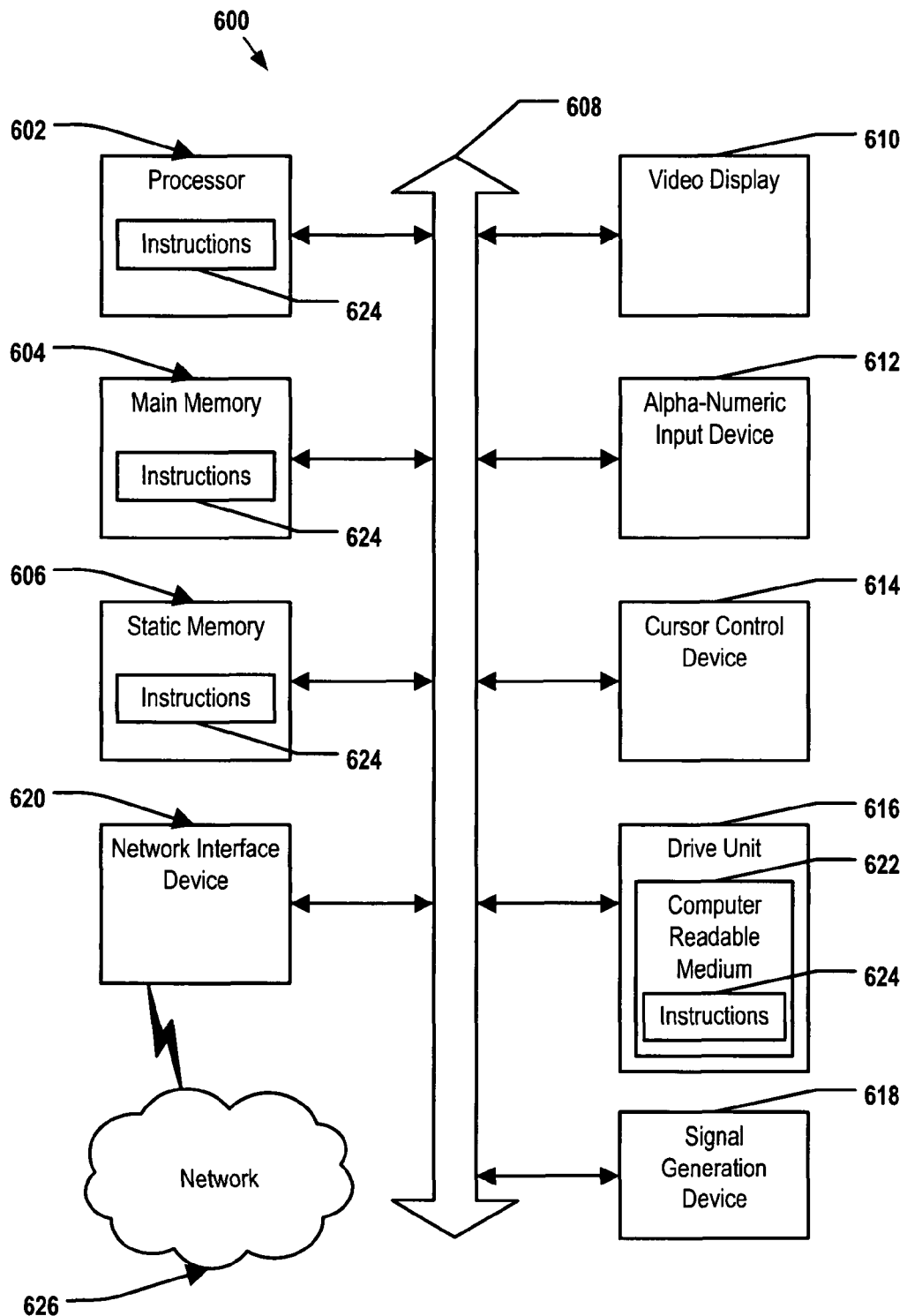
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. For example, the instructions 624 may be executable to form an interactive display at a display device in communication with the computer system 600. In another example, the instructions may be executable to cause the computer system 600 to send processor executable instructions or trigger signals to a remote user device. The computer system 600, or any portion thereof, may operate as a standalone device or may be connected, e.g., using a network, to other computer systems or peripheral devices, including a server or set-top box device, as shown in FIGS. 1-6.

In a networked deployment, the computer system may operate in the capacity of an IPTV server, such as a video server, an application server, an interactive television server, a trigger database server, an instructions database server, or a set-top box device. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include or be in communication with a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. Accordingly, the disclosure is considered to include a tangible storage medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 36 C.F.R. §1.62(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing interactive television content, the method comprising:
   sending a type of interactive content as processor executable instructions associated with television content to a user device to be stored at the user device as stored processor executable instructions, wherein the type of interactive content is selected based on historical information associated with the user device and based on sponsorship settings associated with an advertiser, wherein the historical information includes a programming requests previously received from the user device;
   after the processor executable instructions associated with the television content are sent, sending the television content to the user device; after the processor executable instructions associated with the television content are sent, sending a first interactive program trigger adapted to cause the user device to initiate execution of the stored processor executable instructions to provide a first interactive display related to the television content at a display device, wherein the interactive display includes a plurality of user selectable elements;
   in response to receiving data related to a user selection of a particular user selectable element, sending data to the user device indicating selections received from a plurality of other user devices with respect to the plurality of user selectable elements.

2. The method of claim 1, wherein the television content is sent substantially simultaneously with the interactive program trigger.

3. The method of claim 1, wherein the interactive program trigger is sent via a vertical blanking interval of the television content.

4. The method of claim 1, further comprising receiving a program scheduling request requesting the television content, and sending the television content after the processor executable instructions associated with the television content are sent by an instruction source to the user device to be stored at the user device.

5. The method of claim 1, wherein the television content comprises a television program.

6. The method of claim 1, wherein the television content comprises an advertisement.

7. The method of claim 1, wherein the processor executable instructions associated with the television content are sent to the user device from an instruction source.

8. The method of claim 7, wherein the processor executable instructions are further selected based on user adjustable settings.

9. The method of claim 7, wherein the type of interactive content comprises at least one of an information gathering interactive feature, an informative interactive feature, a product request interactive feature, or a combination thereof.

10. The method of claim 1, wherein the plurality of user selectable elements includes a plurality of voting elements.

11. The method of claim 10, wherein the plurality of voting elements is operable to enable a user to select a favorite character in a program.

12. The method of claim 10, wherein the plurality of voting elements is operable to enable a user to select a preferred episode of a program.

13. The method of claim 1, wherein the particular user selectable element is selected using a hot key of a remote control device.

14. The method of claim 1, wherein the historical information associated with the user device further includes historical user participation information with respect to interactive content.

15. The method of claim 14, wherein the historical user participation information includes a user participation rating compared to the plurality of other user devices.

16. The method of claim 1, wherein the plurality of user selectable elements includes generic user selectable elements that are not associated with specific television content.

17. The method of claim 16, wherein the interactive program trigger includes data that relates the generic user selectable elements to the television content.

18. The method of claim 17, wherein the television content is associated with a game show, wherein a game show question and a plurality of user selectable answers associated with the game show question are provided via the interactive program trigger, and wherein one or more of the generic user selectable elements is populated with one of the plurality of user selectable answers.

19. The method of claim 1, wherein the data indicating selections received from a plurality of other set-top box devices cause the user device to provide a second interactive display, wherein the second interactive display is distinct from the first interactive display.

20. An interactive television system, comprising:
   output to:
   send a type of interactive content as processor executable instructions associated with television content to a remote user device to be stored at the remote user device as stored processor executable instructions, wherein the type of interactive content is selected based on sponsorship settings associated with an advertiser, and
   after the processor executable instructions associated with the television content are sent, send the television content and a trigger signal to the remote user device, wherein the trigger signal is adapted to cause the remote user device to initiate execution of the stored processor executable instructions to provide an interactive display related to the television content at a display device, and wherein the interactive display includes a plurality of user selectable elements;

a user interface module to:
receive data related to a user selection of a particular user selectable element from the remote user device; and
send data to the remote user device indicating selections received from a plurality of other user devices with respect to the plurality of user selectable elements.

21. A set-top box device, comprising:
a memory to receive and store a type of interactive content as processor executable instructions, the processor executable instructions to provide an interactive display at a display device in communication with the set-top box device, wherein the interactive display includes a plurality of user selectable elements, wherein the processor executable instructions are associated with a data stream, wherein the type of interactive content is selected based on sponsorship settings associated with an advertiser;
an input to receive the data stream from a remote network device after the processor executable instructions have been received and stored at the memory, wherein the data stream includes data content and a trigger signal; and
logic to execute the processor executable instructions in response to receiving the trigger signal to provide the interactive display that includes the plurality of user selectable elements; a user interface module to receive a user selection of a particular user selectable element; an output to send data related to the user selection of the particular user selectable element to the remote network device; and
a display device interface to communicate data indicating selections received from a plurality of other set-top box devices with respect to the plurality of user selectable elements to the display device.

22. The set-top box device of claim 21, wherein the data stream and the processor executable instructions associated with the data stream are received via an access network of an internet protocol television system.

23. A method comprising:
receiving and storing, at a user device, a type of interactive content as first processor executable instructions at a first time, wherein the first processor executable instructions are associated with content of a first data stream, wherein the type of interactive content is selected based on historical information associated with the user device and based on sponsorship settings associated with an advertiser, and wherein the historical information includes a programming request previously received from the user device;
receiving, at the user device, the first data stream from a remote network device at a second time, wherein the second time is different from the first time and wherein the first data stream includes first content and a first trigger signal;
executing, at the user device, the first processor executable instructions stored at the user device based on the first trigger signal to generate a first interactive display at a display device associated with the user device, wherein the first interactive display includes a plurality of user selectable elements;
sending data related to a user selection of a particular user selectable element to the remote network device; and
displaying data indicating selections received from a plurality of other user devices with respect to the plurality of user selectable elements.

24. The method of claim 23, wherein the first processor executable instructions associated with the content of the first data stream are received via a first communication path, and wherein the first data stream including the first content and the first trigger signal are received via a second communication path.

25. The method of claim 23, wherein the first interactive display is associated with first television content, and wherein the first trigger signal is received substantially simultaneously with the first television content.

26. The method of claim 23, wherein the first interactive display is associated with first television content, and wherein the method further comprises synchronizing the first interactive display with the first television content based on the first trigger signal.

27. The method of claim 23, further comprising:
receiving and storing, at the user device, second processor executable instructions, wherein the second processor executable instructions are associated with content of a second data stream, wherein the second processor executable instructions associated with the content of the second data stream are selected based at least in part on the historical information associated with the user device;
receiving, at the user device, the second data stream from the remote network device, wherein the second data stream includes second content and a second trigger signal; and
executing, at the user device, the second processor executable instructions stored at the user device based on the second trigger signal to generate a second interactive display at the display device associated with the user device.

28. The method of claim 27, wherein the second interactive display is associated with second television content, and wherein the method further comprises synchronizing the second interactive display with the second television content based on the second trigger signal.

29. A computer-readable storage device comprising computer readable instructions, wherein the computer readable instructions are executable by a processor to:
receive and store, at a set-top box device, a type of interactive content as processor executable instructions at a first time, wherein the processor executable instructions are associated with content of a data stream, wherein the type of interactive content is selected based on sponsorship settings associated with an advertiser;
receive, at the set-top box device, input at a second time, wherein the second time is different from the first time, the input comprising the data stream including content and a trigger signal associated with specific content;
execute, at the set-top box device, the processor executable instructions to generate an interactive display including an interactive feature related to the specific content based on the trigger signal, wherein the interactive display includes a plurality of user selectable elements; and
in response to receiving a user selection of a particular user selectable element, displaying data indicating selections received from a plurality of other set-top box devices with respect to the plurality of user selectable elements.

* * * * *